(12) United States Patent
Jenkins et al.

(10) Patent No.: US 7,844,148 B2
(45) Date of Patent: Nov. 30, 2010

(54) LINEAR MEMBER

(75) Inventors: Peter David Jenkins, Framlingham (GB); Daniel Owen Jenkins, Framlingham (GB)

(73) Assignee: Miniflex Limited (GB)

( * ) Notice: Subject to any disclaimer, the term of this patent is extended or adjusted under 35 U.S.C. 154(b) by 86 days.

(21) Appl. No.: 11/664,006

(22) PCT Filed: Sep. 27, 2005

(86) PCT No.: PCT/GB2005/003683

§ 371 (c)(1), (2), (4) Date: Jul. 2, 2007

(87) PCT Pub. No.: WO2006/035206

PCT Pub. Date: Apr. 6, 2006

(65) Prior Publication Data

US 2008/0044145 A1 Feb. 21, 2008

(30) Foreign Application Priority Data

Sep. 29, 2004 (GB) .................................. 0421611.5

(51) Int. Cl.
G02B 6/26 (2006.01)
G02B 6/02 (2006.01)

(52) U.S. Cl. ......................................... 385/39; 385/123

(58) Field of Classification Search ................... 385/39, 385/123
See application file for complete search history.

(56) References Cited

U.S. PATENT DOCUMENTS

| 4,754,781 | A | | 7/1988 | de Putter | |
|---|---|---|---|---|---|
| 5,094,552 | A | * | 3/1992 | Monroe et al. | 385/76 |
| 5,131,696 | A | * | 7/1992 | Sykes et al. | 285/382 |
| 5,280,552 | A | * | 1/1994 | Yokoi et al. | 385/78 |
| 5,473,723 | A | * | 12/1995 | Stockman et al. | 385/134 |
| 5,528,399 | A | * | 6/1996 | Izumi et al. | 349/116 |
| 5,636,582 | A | * | 6/1997 | Ferguson et al. | 112/142 |
| 5,839,477 | A | | 11/1998 | Murayama | |
| 5,911,939 | A | * | 6/1999 | Jenkins | 264/286 |
| 5,915,056 | A | * | 6/1999 | Bradley et al. | 385/76 |
| 6,170,297 | B1 | * | 1/2001 | Jang et al. | 65/378 |
| 7,064,276 | B2 | * | 6/2006 | Sakabe et al. | 174/110 R |
| 7,437,042 | B2 | * | 10/2008 | Singh | 385/123 |
| 2002/0164130 | A1 | * | 11/2002 | Elkins et al. | 385/87 |
| 2003/0232207 | A1 | | 12/2003 | Thullen et al. | |
| 2005/0098342 | A1 | * | 5/2005 | Sakabe et al. | 174/102 R |
| 2007/0065083 | A1 | * | 3/2007 | Singh | 385/126 |
| 2007/0240843 | A1 | * | 10/2007 | Niiranen | 162/289 |
| 2009/0136184 | A1 | * | 5/2009 | Abernathy et al. | 385/80 |

FOREIGN PATENT DOCUMENTS

| GB | 2 418 391 B | 3/2006 |
|---|---|---|
| JP | 11223752 A | 8/1999 |
| WO | WO87/05376 | 9/1987 |

* cited by examiner

*Primary Examiner*—K. Cyrus Kianni
(74) *Attorney, Agent, or Firm*—Todd N. Hathaway

(57) ABSTRACT

A linear member (10) comprises a first layer (30) and a second layer (40), the second layer being arranged around the first layer. The second layer comprises a series of annular grooves (60). The material for the second layer is substantially stronger than the material for the first layer.

13 Claims, 2 Drawing Sheets

LINEAR MEMBER

Figure 1:
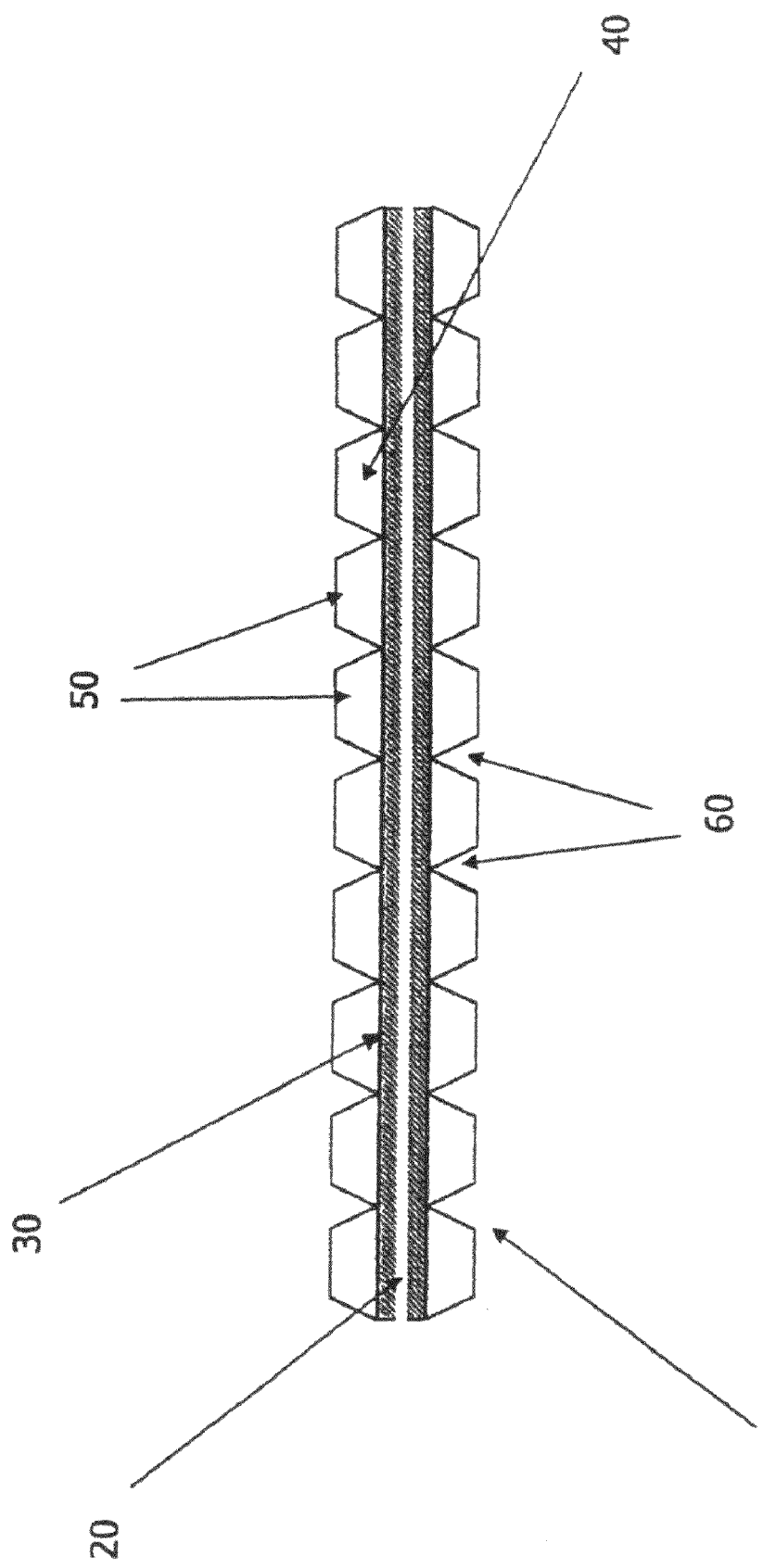

The present invention relates to linear members such as cables or tubes, and in particular to linear members that have been processed to form a series of annular grooves in their outer surfaces.

EP 765 214 discloses an apparatus suitable for forming a series of parallel grooves in the outer wall of a smooth bore tube. The apparatus comprises three rollers which are disposed around the tube as it is passed through the apparatus. One or more of the rollers are grooved and the rotation of the grooved roller(s) forms the sequence of grooves within the outer surface of the tube.

One of the limitations of the apparatus disclosed in EP 765 214 is that the triangular arrangement of the rollers form an interstice through which the tube is passed. The geometry of this arrangement means that it is difficult to process small tubes, for example tubes having a diameter of 3 mm or less.

Our co-pending application GB 0421439.1, filed on 27 Sep. 2004, describes an apparatus in which a similar series of parallel grooves may be formed in the outer wall of a smooth bore tube. The apparatus comprises two opposed rollers, one or more of which may be grooved to form the grooves in the tube, between which a tube is passed in order to provide the grooving. Furthermore, two opposed positioning means are provided to maintain the position of the tube relative to the opposed rollers. This arrangement allows the two opposed rollers can be brought very close together, enabling grooves to be formed in small tubes, for example tubes having a diameter of less than 3 mm. It will be readily understood that as the diameter of the tube is reduced, the amount of material available to form the wall of the tube will reduce. This increases the probability that as the tube is bent, the tube will collapse to a bend radius that will affect the optical and/or mechanical performance of an optical fibre received within the tube. Furthermore, as the annular tube thickness is reduced it is increasingly less likely to have sufficient mechanical rigidity to provide adequate protection against impact and abrasion to an optical fibre.

One approach to this problem is to form the tube from materials that have a greater Young's modulus. However, this has the unwanted consequence that the stiffness of the tube is increased which makes the tube difficult to bend and manipulate. For some applications, for example internal communications networks, automotive applications, etc, this effect is as unwanted as the inadequate impact protection.

According to a first aspect of the present invention there is provided a linear member comprising a first layer and a second layer, the second layer being arranged around the first layer and the second layer comprising a series of annular grooves, wherein the first layer comprises a first material and the second layer comprises a second material, the second material being substantially stronger than the first material.

According to a second aspect of the present invention there is provided a method of producing a linear member comprising the steps of: a) forming a first layer; b) forming a second layer around the first layer; and c) forming a series of annular grooves on the outer surface of the second layer, wherein the first layer comprises a first material and the second layer comprises a second material, the second material being substantially stronger than the first material.

Figure 2:
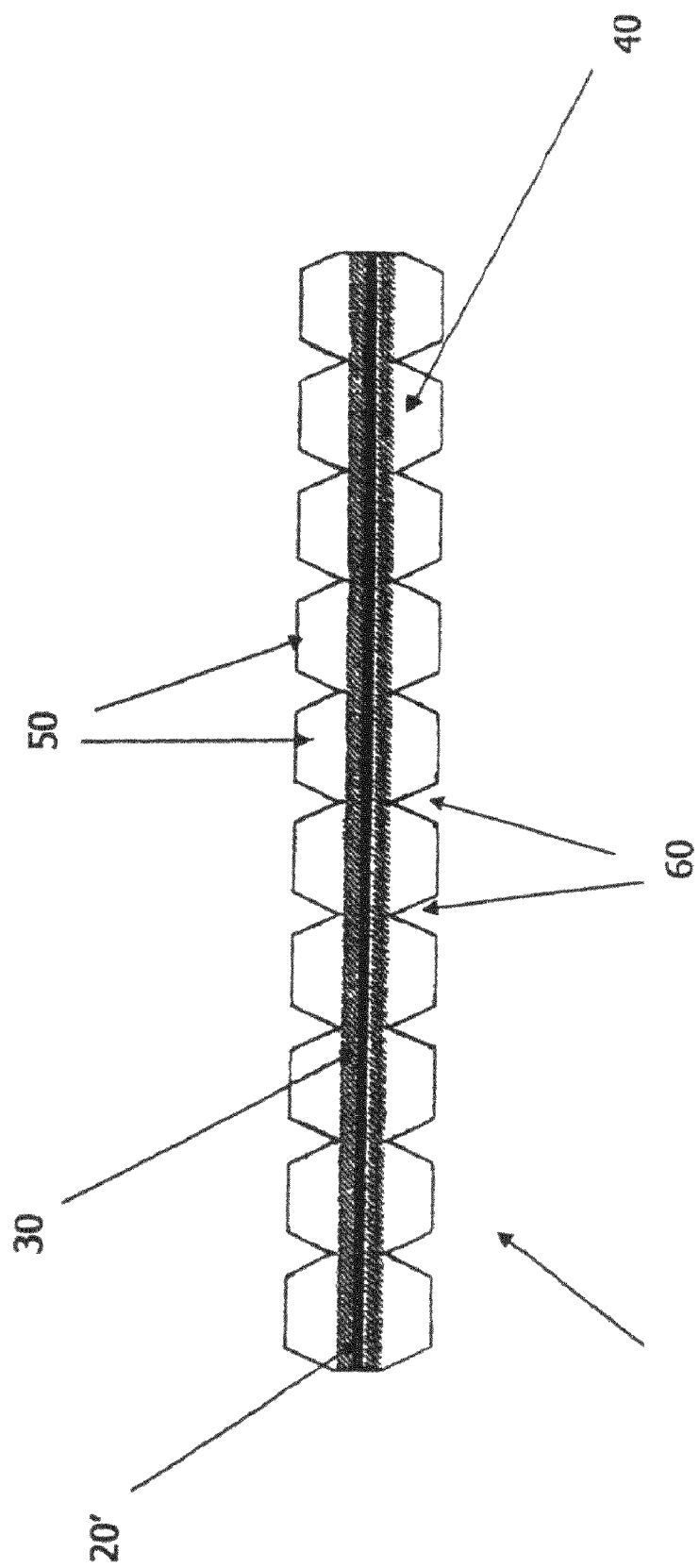

The invention will now be described, by way of example, with reference to the following Figures, in which:

FIG. 1 shows a schematic depiction of a linear member according to the present invention; and FIG. 2 shows a schematic depiction of a linear member according to a further embodiment of the present invention.

FIG. 1 shows a schematic depiction of a linear member 10 according to the present invention. Linear member 10 is a tubular member comprising inner layer 30 and outer layer 40. The inner layer comprises an annular cross-section such that a circular channel 20 is formed in the centre of the linear member. The outer layer has been processed in accordance with EP 765 214 and/or GB 0421439.1 such that the outer layer comprises a plurality of annular grooves 60, which separate sections 50 of the outer layer. As is known, the provision of the series of annular grooves causes the outer layer sections to hinge against each other, such that the linear member can be easily bent to a predetermined bend radius, but a very substantial force must be applied to bend the linear member to a smaller bend radius.

The inner layer 30 and the outer layer 40 are formed from materials having different properties, such that the modulus of the material used to form the outer layer is significantly greater then the modulus of the material used to form the inner layer. Careful selection of these materials enables the linear member to be formed such that it does not have the disadvantages inherent in known small diameter liner members and tubes.

The member may be formed by extruding the inner layer as a tube and then passing the tube through a second extrusion process, during which the outer layer is formed on the inner layer. However, it is preferred that a one-pass co-extrusion process is used to form both the inner and the outer layer. Once the linear member has been formed, the annular grooves are formed within the outer layer of the linear member, using the method described in EP 765 214 and/or GB 0421439.1. The thickness of the outer layer and the cutting depth of the roller(s) used to form the annular grooves are selected such that the annular grooves extend through substantially all of the outer layer, such that there is no, or very little connection between adjacent sections 50 of the outer layer. The advantage of this is that the outer layer has a limited effect on the bending performance of the linear member. Alternatively, the annular grooves may partially extend into the inner layer.

FIG. 2 shows a schematic depiction of a linear member 10' according to a second embodiment of the present invention. The significant difference between linear member 10' and the linear member 10 described above with reference to FIG. 1 is that linear member 10' comprises an optical fibre 20', rather than a circular channel 20. When the linear member 10' is formed, the inner layer and the outer layer are co-extruded onto the optical fibre, such that the linear member 10' has a decreased cross-sectional area when compared with a linear member 10, which has had an optical fibre inserted into the circular channel 20. Otherwise, the structure and the method of forming the structure is the same as those of the embodiment described above with reference to FIG. 1.

It will be understood that the schematic depictions of FIGS. 1 & 2 are not to scale and are intended to describe the present invention. Typically, the outer diameter or the linear member will be 2-3 mm, but it may be smaller than this, for example down to a diameter of several hundred microns, or greater than this range for specific applications. It is preferred that the radial thickness of the inner layer is greater than the radial thickness of the outer layer. The radial thickness of the inner layer may be up to four times the radial thickness of the outer layer; preferably the radial thickness of the inner layer is substantially twice that of the outer layer.

The linear member may be used with any optical fibre, whether formed from plastic (for example, POF MOST, POF IDB, PCS, ETC.) or silica (either multi-mode or single-mode). It will be readily understood that the diameter of the linear member will be determined by the diameter of the optical fibre which is received within the linear member.

The use of a harder, more rigid material to form the outer layer provides the required resistance against crush and impact damage. Additionally, the use of a harder outer layer gives an increased resistance against the tube from being bent beyond its pre-determined bend radius. The use of a softer, more flexible material to form the inner layer allows impacts to be buffered such that the impact is not transferred to an optical fibre received within the member. Furthermore, the more flexible inner layer, in conjunction with the formation of the annular grooves in the outer layer, enables the linear member to be sufficiently flexible so as to be routed, for example within a patch panel, a vehicle, etc. The inner layer must also have sufficient tensile strength to limit the strain that will be experienced by an optical fibre when the linear member is placed under tensile strain.

It has been found that a suitable material for the inner layer is a thermoplastic elastomer, such as a nylon, or a thermoplastic rubber. The outer layer is preferably formed from a high strength engineering polymer, or a thermoplastic elastomer reinforced with glass fibres and/or glass balls. It will be readily understood that other materials having similar properties may also be used to form the inner and/or the outer layers.

Either the inner and/or the outer layer may be processed or modified in order to provide further desirable qualities. Such qualities may include modifying the inner layer in order to decrease the frictional forces encountered when inserted an optical fibre into the tube or to alter the electrical conductivity of the inner layer (in order to reduce the build-up of static electricity within the tube or to allow some form of end-to-end electrical monitoring within the tube. Other modifications may include modification of both layers in order to satisfy fire resistance or toxicity requirements. The outer layer may be treated or modified in order provide chemical resistance. It will be readily understood that the type and the extent of the modification will be determined by the application in which the linear member is to be used.

In a further embodiment of the present invention, the linear member may comprise a first layer and a second layer that are co-extruded from the same material, with different additives being used to provide the different characteristics of the first and second layers. For example, the first layer may comprise PBT (polybutylene terephthalate), a plasticizer and a friction reducing agent. The second layer could then comprise PBT along with glass beads and/or glass fibres to reinforce the outer layer. By using the same material to form the inner and outer layers the co-extrusion process is simplified, with any problems caused by differences in the characteristics of the materials being virtually eliminated.

The co-extrusion process may be controlled so there is an abrupt transition between the first and the second layer. Alternatively, it may be possible to vary the materials being co-extruded such that there is a gradual change from the harder material of the second layer to the softer material of the inner layer. In such a case, the annular grooves would be formed to a depth such that the characteristics of the second layer no longer predominate over the characteristics of the first layer.

The invention claimed is:

1. A linear member comprising:
   a) a first continuous layer defining an interior of the linear member;
   b) a second layer formed around the first continuous layer; and
   c) a series of individual, independent and substantially parallel annular grooves formed on an outer surface of the second layer;
   wherein the first continuous layer comprises a first material and the second layer comprises a second material, the second material being harder and less flexible than the first material, said annular grooves being V-shaped in cross-section so that the second layer defines a grooved external surface of the linear member.

2. A linear member according to claim 1, wherein the first continuous layer is formed round an optical fibre.

3. A linear member according to claim 2, wherein the optical fibre is a plastic optical fibre.

4. A linear member according to claim 1, wherein the first continuous layer has an annular cross-section such that the linear member comprises a cylindrical cavity.

5. A linear member according to claim 1, wherein the radial thickness of the first continuous layer is substantially twice a radial thickness of the second layer.

6. A method of producing a linear member, comprising the steps of:
   a) forming a first continuous layer defining an interior of the linear member;
   b) forming a second layer around the first continuous layer; and
   c) forming a series of individual, independent and substantially parallel annular grooves on an outer surface of the second layer;
   wherein the first continuous layer comprises a first material and the second layer comprises a second material, the second material being harder and less flexible than the first material, said annular grooves being V-shaped in cross-section so that the second layer defines a grooved external surface of the linear member.

7. A method according to claim 6, wherein the first continuous layer is formed around an optical fibre.

8. A method according to claim 7, wherein the first continuous layer is formed around a plastic optical fibre.

9. A method according to claim 6, wherein the first continuous layer is formed to have an annular cross-section such that the linear member comprises a cylindrical cavity.

10. A method according to claim 6, wherein the first continuous layer is formed to have a radial thickness substantially twice a radial thickness of the second layer.

11. A linear member according to claim 1, wherein (a) the first continuous layer defining an interior of the linear member and (b) the second layer formed around the first continuous layer, are co-extruded layers formed in a single process.

12. A method according to claim 6, wherein the steps of (a) forming a first continuous layer defining an interior of the linear member and (b) forming a second layer around the first continuous layer, are carried out in a single co-extrusion process.

13. A method of producing a linear member, comprising the steps of:
   a) forming a first continuous layer defining an interior of the linear member;
   b) forming a second layer around the first continuous layer; and
   c) forming a series of annular grooves on an outer surface of the second layer;
   wherein the steps of (a) forming a first continuous layer defining an interior of the linear member and (b) forming a second layer around the first continuous layer, are carried out in a single co-extrusion process, and wherein the first continuous layer comprises a first material and the second layer comprises a second material, the second material being harder and less flexible than the first material, said annular grooves being V-shaped in cross-section so that the second layer defines a grooved external surface of the linear member.

* * * * *